3,293,296
AMIDINOHYDRAZONES OF 2-HALO-1-CYCLO-ALKENE-1-CARBOXALDEHYDES AND SALTS THEREOF
Leo A. Paquette, Columbus, Ohio, assignor to The Upjohn Company, Kalamazoo, Mich., a corporation of Delaware
No Drawing. Filed Feb. 3, 1964, Ser. No. 342,258
6 Claims. (Cl. 260—564)

This invention relates to novel compositions of matter and to methods of preparing the same. It is particularly directed to novel amidinohydrazones of cyclic halovinyl aldehydes and to processes for the preparation of the same.

The novel compounds of the invention have the following formula:

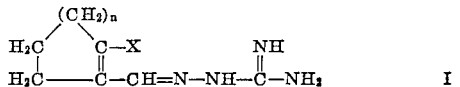

wherein X is selected from the group consisting of chlorine and bromine and $n$ is an integer from zero to 8, inclusive.

The novel compounds of the invention are prepared by reacting a 2-halo-1-cycloalkene-1-carboxaldehyde of the formula:

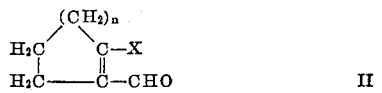

wherein X and $n$ are as given above, with aminoguanidine, advantageously in the presence of an acid medium. The reaction can be carried out in inert media such as water (preferred), methanol, ethanol, and the like, including mixtures thereof with acid, preferably nitric acid. Illustratively, excellent results have been obtained using a 25% (by weight) solution of nitric acid in water. Other acids, for example, hydrochloric acid, sulfuric acid, and the like can also be employed. Aminoguanidine is commerically available in the form of its salts and for reaction purposes aminoguanidine bicarbonate is preferred, although other salts, for example, the hydrochloride, sulfate and the like can be used. Stoichiometrically the reaction requires equimolar amounts of aldehyde and aminoguanidine, although an excess of either reactant can be employed if so desired. Preferably, the aldehyde and aminoguanidine are employed in molar ratios ranging from about 1:1.5 to 1.5:1. Preferably, the reaction is carried out between about 0° C. and about 100° C., and more particularly between about 20° C. and about 75° C. Upon completion of the reaction, the amidinohydrazone acid addition salt can be isolated and purified by conventional procedures, e.g., filtration of the reaction mixture and recrystallization of the product thus obtained. The corresponding free base can be obtained by neutralizing the salt and recovering the base by conventional procedures.

The 2-halo-1-cycloalkene-1-carboxaldehydes of Formula II are prepared by known methods. Illustratively, a cycloalkanone, for example, cyclobutanone, cyclopentanone, cyclohexanone, cycloheptanone, cyclooctanone, cyclononanone, cyclodecanone, cycloundecanone, or cyclododecanone, is reacted with dimethylformamide and a phosphorus halide such as phosphorus oxychloride or phosphorus oxybromide. See Arnold and Zemlicka, Proc. Chem. Soc. 227 (1958); Arnold and Zemlicka, Coll. Czech. Chem. Comm. 24, 2385 (1959); Zemlicka and Arnold, ibid. 26, 2852 (1961); Arnold and Holy, ibid. 26, 3059 (1961); Ziegenbein and Lang, Chem. Ber. 93, 2743 (1960).

The novel compounds of the invention have antibacterial and antifungal activity, for example, against *Staphylococcus aureus, Streptococcus faecalis, Serratia marcescens, Aerobacter aerogenes, Salmonella schottmuelleri, Streptococcus lactis, Staphylococcus albus, Escherichia coli, Klebsiella pneumoniae, Proteus vulgaris, Salmonella gallinarum, Bacillus subtilis, Trichophyton rubrum,* and *Alternaria solani,* and can be used for decontamination of surfaces contaminated with such bacteria and fungi.

The novel compounds of the invention are nitrogenous bases and as such can exist in both the protonated and nonprotonated form according to the pH of the environment. The protonated forms can be isolated as acid addition salts which are useful in upgrading the free bases, that is, the nonprotonated form. Suitable acids for this purpose include nitric acid, hydrochloric acid, sulfuric acid, phosphoric acid, acetic acid, succinic acid, salicyclic acid, maleic acid, thiocyanic acid, fluosilicic acid, picric acid, Reinecke's acid, azobenzenesulfonic acid, and the like. As noted above, the acid addition salts frequently are obtained as initial reaction products, or they can be formed by neutralizing the free base with the appropriate acid or by metathesis. The novel compounds of the invention are also useful as intermediates. Thus, the condensation products obtained from the thiocyanic acid addition salts and formaldehyde according to U.S. Patents 2,425,320 and 2,606,155 are useful as pickling inhibitors. The fluosilicic acid addition salts are useful as mothproofing agents according to U.S. Patents 1,915,334 and 2,075,359. They are also useful in forming amine salts of penicillin of low solubility.

The invention may be more fully understood by reference to the following illustrative examples in which the parts and percentages are by weight unless otherwise specified.

*Example 1.—2-chloro-1-cyclohexene-1-carboxaldehyde amidinohydrazone nitrate*

To a stirred slurry of 15.0 g. (0.11 mole) of aminoguanidine bicarbonate in 75 ml. of water was slowly added 16.4 ml. of concentrated nitric acid. 2-chloro-1-cyclohexene-1-carboxaldehyde (14.5 g.; 0.10 mole) was then added in one portion and within several minutes a crystalline mass had formed. After the mixture had remained at about 25° C. for 2 hours, the solid was separated by filtration, washed with water, and dried. There was obtained 23.4 g. of nitrate salt, M.P. 253–254° C. (dec.). Recrystallization of this material from ethanol-ether gave 2 - chloro - 1 - cyclohexene - 1 - carboxaldehyde amidinohydrazone nitrate as a white powder, M.P. 257–258° C. (dec.).

*Analysis.*—Calcd. for $C_8H_{14}ClN_5O_3$: C, 36.44; H, 5.35; Cl, 13.45; N, 26.55. Found: C, 36.65; H, 5.16; Cl, 13.38; N, 26.03.

*Example 2.—2-bromo-1-cyclohexene-1-carboxaldehyde amidinohydrazone nitrate*

Following the procedure of Example 1, but replacing 2 - chloro - 1 - cyclohexene - 1 - carboxaldehyde with 2-bromo-1-cyclohexene-1-carboxaldehyde, there was obtained 2-bromo-1-cyclohexene-1-carboxaldehyde amidinohydrazone nitrate.

*Example 3.—2-chloro-1-cyclooctene-1-carboxaldehyde amidinohydrazone nitrate*

Following the procedure of Example 1, but replacing 2-chloro-1-cyclohexene-1-carboxaldehyde with 2-chloro-1-cyclooctene-1-carboxaldehyde, there was obtained 17.4 g. of 2-chloro-1-cyclooctene-1-carboxaldehyde amidinohydrazone nitrate in the form of white microneedles, M.P. 197° C. (dec.).

*Analysis.*—Calcd. for $C_{10}H_{18}ClN_5O_3$: C, 41.17; H, 6.22; N, 24.01. Found: C, 41.05; H, 6.12; N, 23.84.

*Example 4.—2-bromo-1-cyclooctene-1-carboxaldehyde amidinohydrazone nitrate*

Following the procedure of Example 3, but replacing 2-chloro-1-cyclooctene-1-carboxaldehyde with 2-bromo-1-cyclooctene-1-carboxaldehyde, there was obtained 2-bromo-1-cyclooctene-1-carboxaldehyde amidinohydrazone nitrate.

Following the procedure of the foregoing examples, but replacing the aldehydes employed therein with 2-chloro- and 2-bromo-1 cyclobutene-1-carboxaldehydes, 2-chloro- and 2-bromo-1-cyclopentene-1-carboxaldehydes, 2-chloro- and 2-bromo-1-cycloheptene-1-carboxaldehydes, 2-chloro- and 2-bromo-1-cyclononene-1-carboxaldehydes, 2-chloro- and 2-bromo-1-cyclononene-1-carboxaldehydes, 2-chloro- and 2-bromo-1-cyclodecene-1-carboxaldehydes, 2-chloro- and 2-bromo-1-cycloundecene-1-carboxaldehydes, and 2-chloro- and 2-bromo-1-cyclododecene-1-carboxaldehydes, there are obtained the nitrates of 2-chloro- and 2-bromo-1-cyclobutene-1-carboxaldehyde amidinohydrazones, 2-chloro- and 2-bromo-1-cyclopentene-1-carboxaldehyde amidinohydrazones, 2-chloro- and 2-bromo-1-cycloheptene-1-carboxaldehyde amidinohydrazones, 2-chloro- and 2-bromo-1-cyclononene-1-carboxaldehyde amidinohydrazones, 2-chloro- and 2-bromo-1-cyclodecene-1-carboxaldehyde amidinohydrazones, 2-chloro- and 2-bromo-1-cycloundecene-1-carboxaldehyde amidinohydrazones, and 2-chloro- and 2-bromo-1-cyclododecene-1-carboxaldehyde amidinohydrazones, respectively.

The nitrate salts produced according to the foregoing examples can be converted to the free bases by neutralization with alkali, for example, sodium or potassium hydroxide. The free bases can be converted to other acid addition salts by the procedures outlined above, for example, to the hydrochlorides, sulfates, phosphates, acetates, succinates, salicylates, and maleates.

I claim:
1. A compound of the formula:

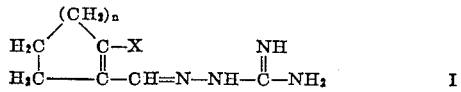

I wherein X is selected from the group consisting of chlorine and bromine and $n$ is an integer from zero to 8, inclusive.

2. An acid addition salt form of a compound of claim 1.
3. 2-chloro-1-cyclohexene-1-carboxaldehyde amidinohydrazone.
4. 2-chloro-1-cyclohexene-1-carboxaldehyde amidinohydrazone nitrate.
5. 2-chloro-1-cyclooctene-1-carboxaldehyde amidinohydrazone.
6. 2-chloro-1-cyclooctene-1-carboxaldehyde amidinohydrazone nitrate.

References Cited by the Examiner

UNITED STATES PATENTS 2,952,677    9/1960    Birtwell et al.

OTHER REFERENCES

Arnold et al.: "Chemical Abstracts," vol. 53, p. 6067 (1959), QD1A51.

Dreiding et al.: "Jour. Amer. Chem. Soc.," vol. 75, pp. 939–43, QD1A5.

Migrdichian: "Organic Synthesis," vol. 1, pp. 154–5 (1957), QD262M55.

Mousseron et al.: "Chemical Abstracts," vol. 42, p. 3734 (1948), QD1A51.

Scott et al.: "Chemistry and Industry," August 9, 1952, No. 32, p. 782 (1952), TP1563.

CHARLES B. PARKER, *Primary Examiner.*

R. V. HINES, *Assistant Examiner.*